(No Model.)
S. E. HURLBUT.
FLEXIBLE JOINT FOR UNDERGROUND ELECTRICAL CONDUITS.
No. 352,754. Patented Nov. 16, 1886.
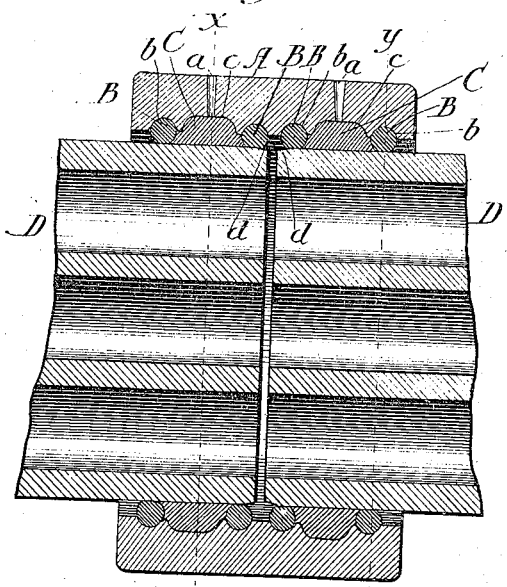
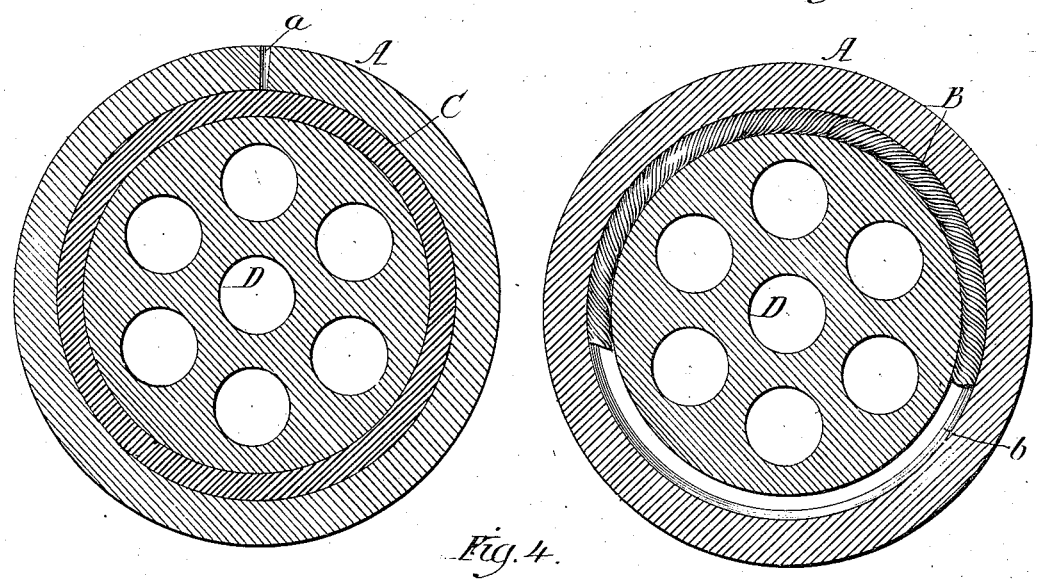
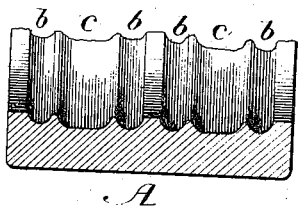
Witnesses:
Albert H. Adams
Harry T. Jones
Inventor:
Seth E. Hurlbut

UNITED STATES PATENT OFFICE.

SETH E. HURLBUT, OF CHICAGO, ILLINOIS.

FLEXIBLE JOINT FOR UNDERGROUND ELECTRICAL CONDUITS.

SPECIFICATION forming part of Letters Patent No. 352,754, dated November 16, 1886.

Application filed June 14, 1886. Serial No. 205,123. (No model.)

*To all whom it may concern:*

Be it known that I, SETH E. HURLBUT, residing at Chicago, in the county of Cook and State of Illinois, and a citizen of the United States, have invented a new and useful Improvement in Flexible Joints for Underground Electric Conduits, of which the following is a full description, reference being had to the accompanying drawings, in which—
Figure 1 is a sectional elevation showing the joint applied to an electrical conduit; Fig. 2, a cross-section on line $x$ $x$ of Fig. 1; Fig. 3, a cross-section on line $y$ $y$ of Fig. 1; Fig. 4, a detail in section showing the coupling-ring.
My invention relates to underground conduits for electric conductors, and is particularly designed as an improvement upon the invention forming the subject-matter of United States Patent No. 340,046, granted to Daniel N. Hurlbut, April 13, 1886. In said patent is shown a water-tight and gas-proof flexible joint for connecting the sections of which the underground conduit is composed. I retain the principal or main features of such patented invention and provide the improvements hereinafter specified and claimed, which will insure a more perfect and simple flexible joint, and render the operation of forming the joint more easy and expeditious than in the patent referred to.

In the drawings, A represents a collar or ring having an interior diameter somewhat larger than the diameter of the pipe ends which it is to encircle. This collar or ring A can be made of cement, iron, or other suitable material, and is provided with openings $a$ for the pouring in of the liquid filling or cement, and its interior face is provided with semicircular grooves $b$, two on each side of the center of the ring, and between the semicircular grooves $b$ on each side is a wider groove, $c$, in the form of construction shown.

B represents ropes of asbestus or other compressible material that will yield somewhat and still be firm enough to maintain a unity when the ring A, with the retaining material B, encircles the pipe end. The asbestus ropes or retainers B fit within the interior of the ring A, running entirely around in the grooves $b$, and they project beyond the inner face of the ring or collar A, to produce a hole of a less diameter than the diameter of the pipe end. These asbestus or other flexible ropes are introduced into the grooves $b$ in the collar or ring A, and are held therein by their own elasticity; or, in other words, they are inserted in the grooves and are held by their springiness, which causes them to form an arch, so that they cannot drop out of place.

C is a liquid filling of asphaltum or other material that will harden somewhat after being poured in, which filling is located in the groove $c$ on each side of the center of the ring and around the pipe end between the retainers B, and is poured into place through the opening $a$.

D represents the sections of pipe, the form represented being a conduit or pipe designed for electrical conductors; but the device is to be used in connection with sewer, drain, or other pipe where it is desirable to have a close tight joint at the juncture of the sections. As shown, the end of each pipe D is tapered, as at $d$, to facilitate the slipping of the pipe end into the ring or collar.

In use the ring A has inserted in the grooves $b$ on its inner face the retainers or packing B, and is then ready to be applied to the pipe ends by inserting such ends into the ring, and the act of inserting compresses the packing or retainers B, adjoining the surface of the pipe, so as to produce a slightly-flattened surface, which serves to expand the packing or retainer B and make a close fit between the ring A, packing B, and pipe end. The liquid asphaltum or cement is poured into the hole $a$, filling the space in the groove $c$ and between the packing or retainers B, as shown in Fig. 1, and as the packing or retainers are in close contact with the surface of the ring and the surface of the pipe, the liquid material can only extend to and fill the space between the two packings or retainers.

The joint thus produced is very close and tight, as the packing or retainer B in and of itself makes a fairly tight joint, which, with the liquid material, is made absolutely tight, and it will be seen that the pipe ends do not abut one against the other, and that between the extreme end of each pipe end and the interior face of the ring or collar A is a space, which is vacant or left unfilled with either the liquid material or the packing or retainer B, and also that at each end of the collar or ring and between the interior face of the collar or ring and the exterior surface of the pipe is an unfilled space, so that with the ends not abutting the pipe-section is free to move to some extent, allowing the pipe-section to drop, or be otherwise changed without affecting the tightness of the joint.

In the Patent No. 340,046, above referred to, is disclosed a flexible joint for pipe-sections, which is flexible, so as to allow for the upheaving or settling of the pipes. Said joint is formed by wrapping a flexible packing around the pipe-section to be entered into an adjoining section and then pouring a liquid filling, which, when cool, remains permanently plastic in a space formed between the flexible packing on the entering pipe-section. The flexible packing in the patent referred to is held in place by tying or other means, and is very liable to drop out of place or become disarranged when the joint is being formed. In the present invention, however, the flexible packing or so-called "retainers" are sprung into place and are held in a ring or collar, which is entered by the pipe-sections to be joined. This construction and manner of forming the joint, as heretofore described, insures greater simplicity and removes the objections possessed by the joint shown in the patent above referred to. In the present invention I also dispense with the shoulders on the pipe-sections heretofore required to form seats for the flexible packing, and other advantages are obtained which will readily be apparent.

What I claim as new, and desire to secure by Letters Patent, is—

The combination, with two conduit-sections capable of movement relative to each other, of a ring or collar having interior circumferential grooves, $b$, the flexible packing B, held in said grooves by its own elasticity and projecting beyond said grooves, the grooves $c$, arranged between said packing B, and the permanently-plastic filling C, contained in said grooves $c$, the ring or collar having holes $a$ communicating with the grooves $c$, substantially as described.

SETH E. HURLBUT.

Witnesses:
ALBERT H. ADAMS,
O. W. BOND.